(12) United States Patent
Zhu et al.

(10) Patent No.: US 9,508,370 B1
(45) Date of Patent: Nov. 29, 2016

(54) REPEATED RUNOUT (RRO) COMPENSATION FOR ALTERNATING TRACKS IN AN INTERLACED MAGNETIC RECORDING SYSTEM

(71) Applicant: Seagate Technology LLC, Cupertino, CA (US)

(72) Inventors: Wenzhong Zhu, Apple Valley, MN (US); Peter S. Harllee, Boulder, CO (US); Ralph William Cross, Lyons, CO (US); Kenneth A. Haapala, Plymouth, MN (US); Edward Charles Gage, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/165,492

(22) Filed: May 26, 2016

(51) Int. Cl.
G11B 5/596 (2006.01)

(52) U.S. Cl.
CPC ................ *G11B 5/59627* (2013.01)

(58) Field of Classification Search
None
See application file for complete search history.

(56) References Cited

U.S. PATENT DOCUMENTS

| | | | |
|---|---|---|---|
| 6,304,398 B1 | 10/2001 | Gaub et al. | |
| 6,671,119 B2 | 12/2003 | Baumann et al. | |
| 6,853,511 B2 * | 2/2005 | Seng | G11B 5/59627 360/77.08 |
| 6,867,943 B2 * | 3/2005 | Harmer | G11B 5/59627 360/77.04 |
| 6,898,047 B2 * | 5/2005 | Shishida | G11B 21/106 360/77.04 |
| 7,027,256 B1 | 4/2006 | Subrahmanyam et al. | |
| 7,082,007 B2 * | 7/2006 | Liu | G11B 5/5526 360/77.02 |
| 7,453,664 B2 * | 11/2008 | Kawabe | G11B 5/596 360/77.08 |
| 7,457,075 B2 * | 11/2008 | Liu | G11B 5/59605 360/77.04 |
| 7,576,941 B1 | 8/2009 | Chen et al. | |
| 7,787,209 B1 * | 8/2010 | Liikanen | G11B 5/59627 360/77.04 |
| 8,120,871 B1 * | 2/2012 | Sutardja | G11B 5/59627 360/77.04 |
| 8,611,037 B2 * | 12/2013 | Kawabe | G11B 20/10222 360/77.04 |
| 8,693,134 B1 * | 4/2014 | Xi | G11B 5/59627 360/77.04 |
| 8,848,310 B2 | 9/2014 | Buch | |
| 8,913,338 B1 | 12/2014 | Chahwan et al. | |
| 9,099,103 B1 | 8/2015 | Krichevsky | |
| 9,286,925 B1 * | 3/2016 | Shepherd | G11B 5/59627 |
| 9,343,094 B1 * | 5/2016 | Ma | G11B 5/59622 |
| 9,349,400 B1 * | 5/2016 | Dhanda | G11B 5/59655 |
| 2001/0036033 A1 * | 11/2001 | Baumann | G11B 5/59605 360/77.08 |
| 2005/0201003 A1 * | 9/2005 | Shishida | G11B 21/106 360/77.04 |
| 2007/0050593 A1 | 3/2007 | Chen et al. | |
| 2008/0278842 A1 | 11/2008 | Hebbar et al. | |
| 2009/0244759 A1 * | 10/2009 | Mori | G11B 5/59627 360/47 |
| 2010/0079898 A1 * | 4/2010 | Watanabe | G11B 5/59688 360/75 |
| 2011/0051286 A1 * | 3/2011 | Pokharel | B82Y 10/00 360/131 |

* cited by examiner

*Primary Examiner* — Wayne Young
*Assistant Examiner* — James L Habermehl
(74) *Attorney, Agent, or Firm* — Hall Estill Attorneys at Law (57) ABSTRACT

Method and apparatus for controlling the position of a control object in a closed loop control system, such as a servo control system used in a data storage device. In some embodiments, spaced apart first and second data tracks are written to a rotatable data recording medium without using repeated runout (RRO) compensation values to correct for RRO error in servo data written to the medium. A third data track is subsequently written so as to be interspersed between and partially overlap the first and second data tracks. The third data track is written using a set of RRO compensation values to correct for the RRO error in the servo data.

20 Claims, 7 Drawing Sheets

FIG. 14

REPEATED RUNOUT (RRO) COMPENSATION FOR ALTERNATING TRACKS IN AN INTERLACED MAGNETIC RECORDING SYSTEM

SUMMARY

Various embodiments of the present disclosure are generally directed to a method and apparatus for controlling the position of a control object in a closed loop control system, such as a servo control system used in a data storage device.

In some embodiments, spaced apart first and second data tracks are written to a rotatable data recording medium without using repeated runout (RRO) compensation values to correct for RRO error in servo data written to the medium. A third data track is subsequently written so as to be interspersed between and partially overlap the first and second data tracks using a set of RRO compensation values to correct for the RRO error in the servo data.

In further embodiments, a data storage device has a data storage medium with a plurality of concentric tracks configured to store user data from a host device, the tracks comprising bottom tracks interleaved with top tracks so that each top track is disposed between and partially overlaps an adjacent pair of the bottom tracks. A data read/write transducer is provided adjacent the medium. A memory is configured to store repeated runout (RRO) compensation values for the top tracks. A control circuit is configured to write data to the medium by directing the transducer to write spaced apart first and second data tracks characterized as bottom tracks without using repeated runout (RRO) compensation values to correct for RRO error in servo data written to the medium. The control circuit is further configured to subsequently write a third data track characterized as a top track interspersed between the first and second data tracks to partially overlap each of the first and second data tracks using a set of the RRO compensation values from the memory to correct for the RRO error in the servo data.

These and other features of various embodiments can be understood with a review of the following detailed description in conjunction with the accompanying drawings.

DETAILED DESCRIPTION

The present disclosure is generally directed to closed loop positional control systems, and more particularly to a method and apparatus for enhancing positional control in a closed loop control system such as a data storage device.

Data storage devices store and retrieve data from a host device in a fast and efficient manner. Such devices are often provided with a top level control circuit (controller) and one or more forms of data storage media, such as rotatable magnetic recording media (discs) in hard disc drives (HDDs) or solid-state memory cells in solid-state drives (SSDs).

HDDs generally arrange the rotatable magnetic recording media so as to rotate at a constant angular velocity. A corresponding array of data read/write transducers (heads) move across the recording surfaces of the media to write and read data to fixed sized sectors arranged along concentric data tracks. Embedded servo data may be supplied on the recording surfaces to provide positional information used by a servo control circuit to maintain the transducers in a desired relation to the data tracks. The servo data may be arranged as spaced apart servo wedges that extend radially across the discs. Each wedge is formed from a number of radially adjacent servo fields. Data sectors can be defined during a formatting operation in the spaces between adjacent pairs of the servo fields at a given radius to provide a series of concentric tracks.

While the servo data are nominally arranged to define concentric reference points on the media, in practice small variations will tend to exist in the locations of the servo data. These placement errors result in written in repeated run out (WIRRO) errors that should be accounted for if the transducers are to follow nominally concentric paths around the discs.

A technique sometimes referred to as zero acceleration path (ZAP) compensation or repeated runout (RRO) compensation can be employed to derive compensation values that indicate the radial offset of the individual servo fields. By subtracting out the ZAP compensation values indicative of the radial error in the placement of the servo fields, a servo control circuit can cause a given transducer to trace out a nominally concentric (e.g., "zero acceleration") path over each revolution of the corresponding disc. Stated another way, nominally circular tracks can be written and read even in the presence of errors in the radial locations of the servo data.

A number of ZAP (or "RRO") compensation techniques are known in the art. Each of these techniques usually involves reading data from data tracks while measuring the offsets over multiple revolutions to derive a set of compensation values. The compensation values are thereafter injected into the positioning loop to compensate for the offsets in the locations of the individual servo fields. The compensation values may be written to specialized compensation fields in the servo fields or in other memory locations. Separate read and write compensation values can be provided to account for the relative offsets of respective read sensors and write elements in the data transducers.

One limitation associated with existing RRO compensation routines is the time consuming nature of these various processes. Multiple revolutions of servo position error samples are usually required to obtain an accurate estimate of the WIRRO for every track. An additional revolution may be required to write each WIRRO (or RRO) correction value following the end of the servo field for every servo wedge. Because modern transducers tend to provide separate read and write elements separated by a gap, and because the transducers are usually moved along an arcuate path through the use of a rotary actuator, the transducers may be positioned differently for write operations as compared to read operations on the same track. It follows that some RRO processing systems require the generation of separate read and write RRO compensation values, which further increases the required processing time.

With the continuing trend of providing data storage devices such as HDDs with ever higher data capacities, successive generations of devices will continue to be provided with greater numbers of tracks that are both spaced closer together and have smaller radial width. These developments are expected to further extend the overall time required to complete the ZAP processing and provide effective RRO compensation values for use by the device. Greater system processing and storage resources will also be required to accommodate and utilize the compensation values.

Accordingly, various embodiments of the present disclosure are generally directed to an apparatus and method that overcome these and other limitations of the existing art. As explained below, various embodiments operate to generate RRO compensation values for only a subset of the tracks in a storage device. Without limitation, in some embodiments the tracks are arranged into concentric zones, and the respective tracks in each zone are alternately designated as odd and even tracks. Only one of these types of tracks (e.g., even or odd) are provided with RRO compensation values, and the remaining type is not. For reference, those tracks (e.g., odd tracks) that are not provided with compensation values may be variously identified as first tracks, a first set of tracks, and/or bottom tracks. Those tracks (e.g., even tracks) that are provided with the compensation values may be variously referred to as second tracks, a second set of tracks, and/or top tracks.

During operation, the storage device writes the first set of tracks (e.g., odd or bottom tracks) to a particular zone in a spaced apart relation. Each of the bottom tracks in the zone may be written until the zone is filled with nominally 50% of its total number of tracks. The bottom may be written with a relatively larger first track width, a first track pitch and a first linear density. No RRO compensation is applied during the writing of the bottom tracks.

Further data are written to the zone by writing a second set of tracks (e.g., the even or top tracks). The top tracks are interlaced between the bottom using interlaced magnetic recording (IMR) techniques so that each top track partially overlaps an adjacent pair of the bottom tracks. The top tracks may be written at a relatively smaller second track width, a smaller second track pitch and a smaller second linear density. RRO compensation is applied during the writing of the top tracks.

Because RRO compensation values are only required for the second set of tracks, the overall time required to generate and store the RRO compensation values can be significantly reduced by upwards of around 50% or more. Moreover, since initial writing of the data to odd tracks (in this example) does not require the presence of RRO compensation values, the loading of such values from a memory can be postponed during device initialization, thereby decreasing the time required to place the device in an operational mode.

While the present case is usable for a single write element/ single read element per transducer configuration, multi-sensor and multi-write elements are envisioned. All forms of rotatable disc write technology can be utilized as desired including but not limited to longitudinal and perpendicular magnetic recording systems, heat assisted magnetic recording systems, shingled magnetic recording, two dimensional magnetic recording, three dimensional magnetic recording, etc.

Figure 1:
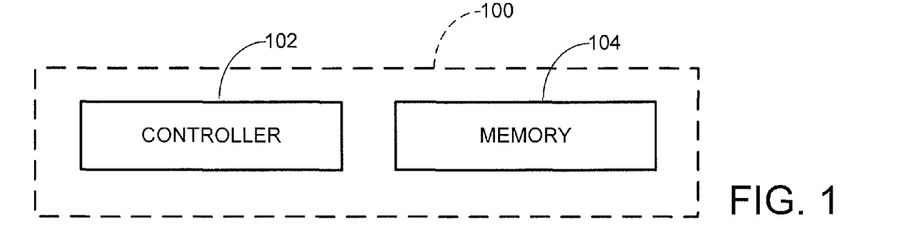
FIG. 1 is a simplified functional block diagram of a data storage device constructed and operated in accordance with various embodiments of the present disclosure.

These and other features of various embodiments of the present disclosure can be understood beginning with a review of FIG. 1 which provides a simplified representation of a data storage device 100 of the type used to store and retrieve user data from a host device. The device 100 includes a controller (control circuit) 102 and a memory module 104.

The controller 102 is a hardware or programmable processor based control circuit that provides top level communication and control functions as the device interfaces with the host device. In the case of a hardware processor, various logic circuit gates and other hardware circuit elements may be provided to carry out the various required functions such as in the form of a hardware state machine. In the case of a programmable processor, suitable programming instructions may be stored in a memory and executed by the processor as required to carry out the requisite functions.

Data from the host device is transferred for storage in the memory 104 responsive to a host write command, and returned back to the host from the memory responsive to a host read command. The memory can take a variety of forms, including rotatable storage media as set forth in FIG. 2.

Figure 2:
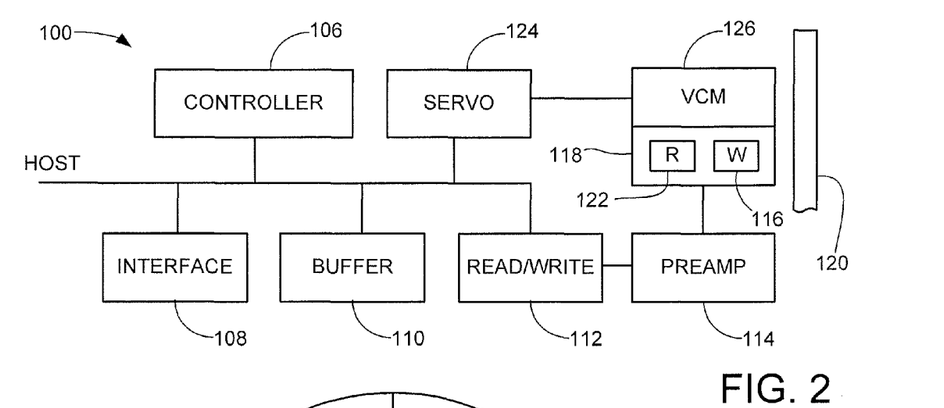
FIG. 2 is a schematic representation of aspects of the data storage device of FIG. 1 characterized as a hard disc drive (HDD) in accordance with some embodiments.

FIG. 2 is a generalized functional representation of the data storage device 100 of FIG. 1 in accordance with some embodiments. The internal architecture can vary as required so FIG. 2 is meant to convey a general overview of various systems, circuits and components. Other forms can be used.

The device 100 in FIG. 2 is characterized as a hard disc drive (HDD) and includes a top level controller (control circuit) 106, which may correspond to the controller 102 in FIG. 1. A host interface circuit 108 provides communications with the external host under the direction of the controller 106, including the processing of data transfers, commands, status requests, etc. A buffer memory 110 provides for the temporary storage of user data pending transfer to/from the host, and may store other data as well such as control parameters, programming used by the controller 106, etc.

A read/write (R/W) channel circuit 112 provides signal conditioning during write and read operations. User data to be written by the device 100 are encoded by a write portion of the channel 112 such as via encryption, compression, run length limited (RLL) encoding, error detection and correction (EDC) encoding, etc. Encoded data are supplied to a preamplifier/driver (preamp) circuit 114 which applies bi-directional, time varying write currents to a write element (W) 116 of a data transducer 118. The write element 116 may take the form of a perpendicular write coil that writes a corresponding sequence of magnetic flux transitions to tracks defined on a rotatable recording medium (disc) 120.

During a read operation to recover previously written data, a read element (sensor) 122 of the transducer 118 detects the magnetic pattern to generate a readback signal that is preamplified and conditioned by the preamp 114 and forwarded to the channel 112. A read portion of the channel 112 applies signal processing to the recovered signal including detection, decoding, decryption, decompression, error detection and correction, etc. to output the originally stored data to the buffer 110. The interface 108 thereafter transfers the data to the requesting host. The read sensor 122 can take a variety of forms, such as a magnetoresistive (MR) sensor or the like.

A servo control circuit 124 operates to position the respective write and read elements 116, 122 adjacent the disc 120 during read and write operations. Servo data written to the disc 120 are detected by the read sensor 122, demodulated by the channel 112 and processed by the servo control circuit 124 to generate a position signal indicative of the radial position of the read sensor. A corresponding current command signal is input to a voice coil motor (VCM) 126 affixed to the transducer 118 to adjust the position of the transducer accordingly. It is contemplated that the VCM 126 and the transducer 118 are supported by a rotary swing-arm type actuator 128 which causes the transducer to take an arcuate path across the disc 120. Because of this path, as well as the fact that a gap exists between the respective write element 116 and read sensor 122, the transducer 118 may be positioned in slightly different locations when accessing a selected track for respective write and read operations.

Figure 3:
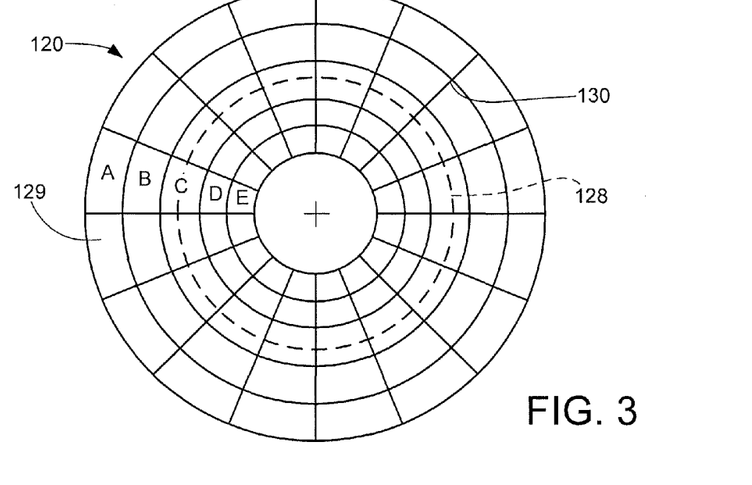
FIG. 3 shows a rotatable magnetic recording medium (disc) from FIG. 2.

FIG. 3 depicts the magnetic recording disc 120 from FIG. 2 in accordance with some embodiments. One exemplary track is denoted in broken line fashion at 128. In practice, adjacent tracks are provided across the media recording surface of the disc 120 from an outermost diameter (OD) to an innermost diameter (ID). Zone based recording (ZBR) techniques may be employed so that the tracks are arranged into concentric zones 129. Five exemplary zones 129 are depicted in FIG. 3 denoted as zones A-E, although any plural number of zones can be used as desired. The exemplary track 128 is located within zone C. In ZBR recording, all of the tracks 128 in each zone 129 are written at a constant frequency, with a different selected frequency for each zone. This allows higher recording frequencies to be utilized adjacent the OD of the disc and lower recording frequencies adjacent the ID of the disc.

Servo data fields 130 are arranged in the form of spaced apart servo wedges that radially extend across the disc recording surfaces much like spokes on a wheel. The servo data fields 130 store the servo data utilized by the servo circuit 124 to provide positional control of the transducer(s) as discussed above in FIG. 2. While only a few servo fields 130 are shown in FIG. 3 for purposes of illustration, it will be understood that a larger number of servo fields will usually be provided per track, such as but not limited to about 200-400 servo fields per track.

Figure 4:
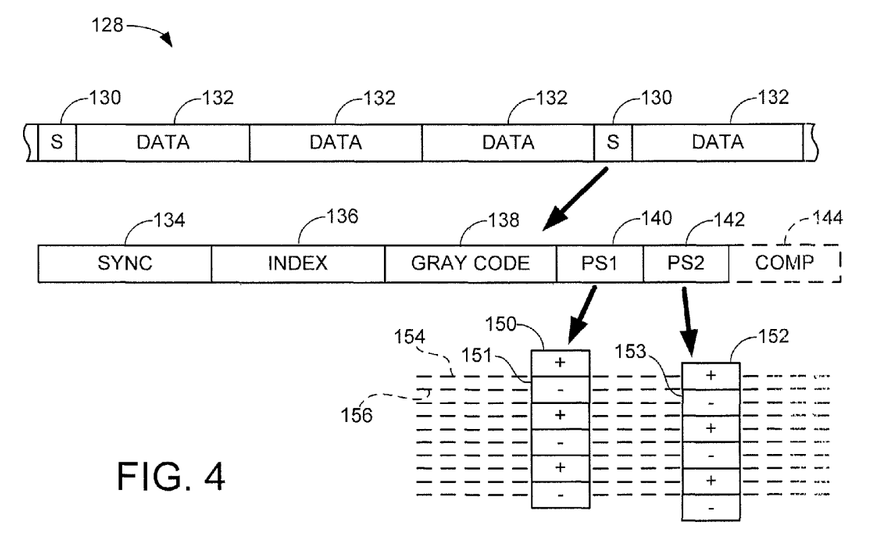
FIG. 4 shows an exemplary format for servo and data tracks defined on the data recording surface of FIG. 2.

FIG. 4 provides a generalized format for the exemplary track 128 from FIG. 3. Other formats can be used. The servo fields 130 from FIG. 3 are denoted as (S) fields. Regions between adjacent pairs of the servo fields 130 are used to define a series of data blocks, or data sectors 132. The data sectors each store a fixed amount of encoded user data, such as 512 bytes.

An exemplary format for each servo field 130 can include a synchronization (sync) field 134, an index field 136, a Gray code (track ID) field 138, and servo positioning fields PS1 140 and PS2 142. Other formats can be used. One or more optional compensation (comp) fields 144 can be appended to at least certain ones of the servo fields 130 to store RRO compensation values, as explained below.

Generally, the sync field 134 is a unique bit sequence to signal to the servo circuit passage of a servo field 130 adjacent the transducer 114. The index field 136 signifies the angular position of the servo field, and the Gray code field 138 signifies the radial position of the servo field on the disc surface.

The PS1 and PS2 fields 140, 142 are alternating servo burst fields with variable polarities as shown. The PS1 fields 140 are each arranged as radially aligned positive (+) burst fields 150 and negative (−) burst fields 151. The PS2 fields 142 are similarly arranged as +burst fields 152 and −burst fields 153. Servo nulls 154 are defined at the juncture between each adjacent pair of the bursts 150, 151 in the PS1 fields 140, and servo nulls 156 are defined at the junction between each adjacent pair of the bursts 152, 153.

The PS1 and PS2 fields are radially offset to define the nulls 154, 156 at half-track locations. These define so-called servo tracks which can be used to define to define the locations of the data sectors 132. The position of the read sensor 122 with respect to the track 128 (see FIGS. 2-3) can be determined in relation to the relative amplitude and phase of the outputs provided by the PS1 and PS2 fields.

Figure 5:
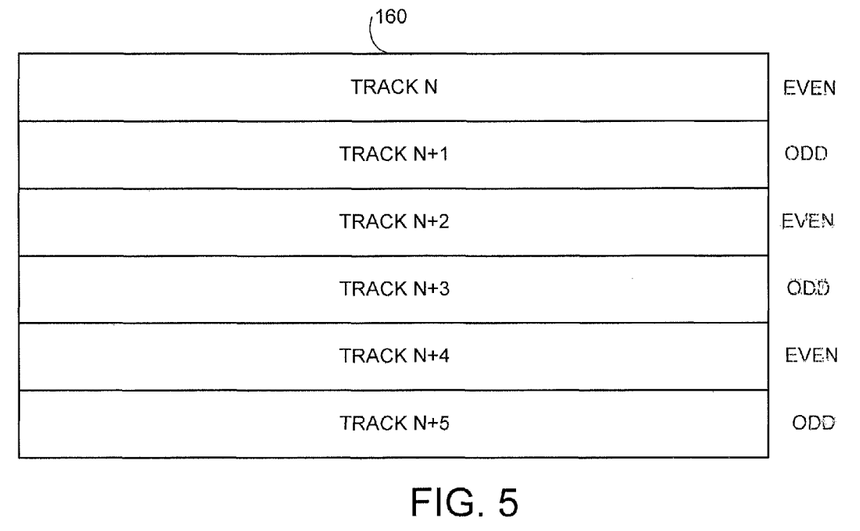
FIG. 5 shows alternating (even and odd) data tracks in accordance with some embodiments.

FIG. 5 shows a number of adjacent tracks 160 similar to the track 128 in FIG. 4. The tracks are shown in a staggered fashion for simplicity of illustration. The tracks are arbitrarily denoted as track N to track N+5. It is contemplated that the tracks 160 reside within a given concentric zone on the disc 120. The tracks are divided into alternating odd (bottom) and even (top) tracks, with each even track disposed between an adjacent pair of the odd tracks. It is contemplated that odd and even tracks such as the tracks 160 in FIG. 5 are written using interlaced magnetic recording (IMR) techniques so that a first type of the tracks, such as the odd tracks, are written first (e.g., the bottom tracks), followed by the writing of the even tracks (the top tracks).

Figure 6:
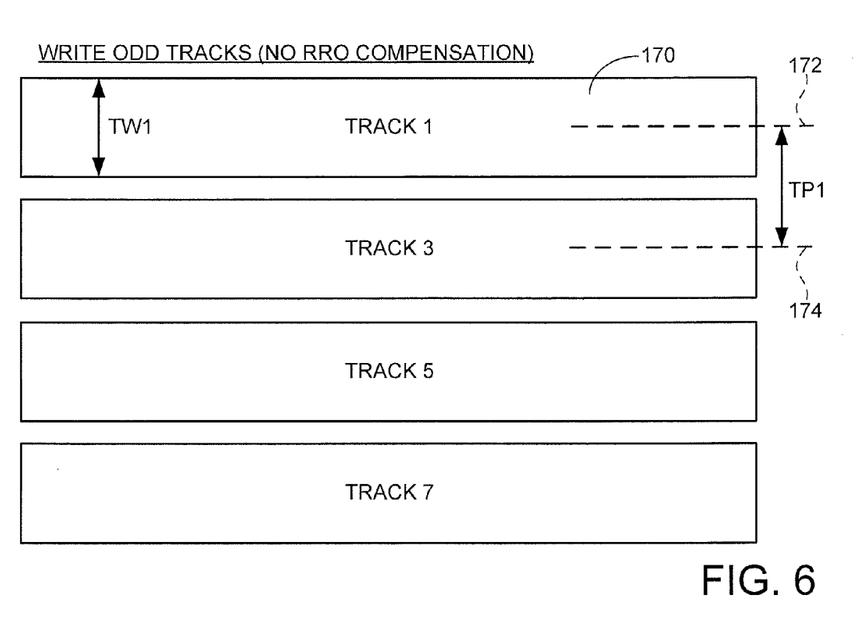
FIG. 6 depicts the writing of a first alternating set of tracks to the medium.
Figure 7:
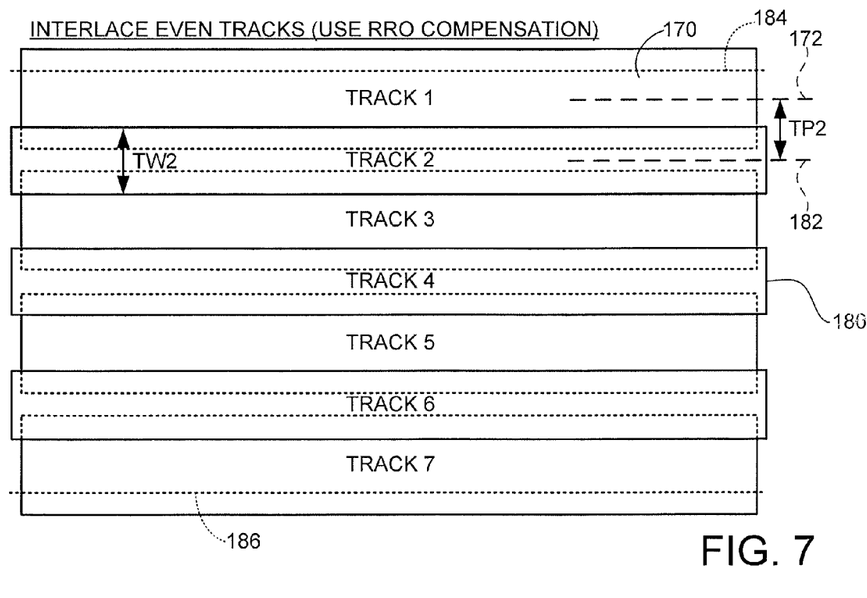
FIG. 7 depicts the subsequent writing of a second alternating set of tracks to the medium that are interlaced with the first set from FIG. 6.

IMR techniques are illustrated in greater detail in FIGS. 6-7. FIG. 6 shows a first set of tracks 170 written to an associated medium such as the disc 120. The tracks 170 are contemplated as comprising odd tracks and are denoted as tracks 1, 3, 5 and 7. This convention is arbitrary as the even tracks could be written first rather than the odd tracks. It will be noted that the odd tracks 170 are relatively widely spaced at a first track pitch TP1, as represented by the nominal radial spacing distance between centerline 172 for track 1 and centerline 174 for track 3. The odd (bottom) tracks 170 are further written with a first track width TW1 and, as desired, may be written at a first, relatively larger linear bit density (e.g., number of bits per linear unit, such as bits per inch, BPI).

A second set of intervening (interlaced) tracks 180 are subsequently written, as shown in FIG. 7. The top (even) tracks 180 are arranged so as to partially overlap each adjacent pair of the odd tracks and are arbitrarily denoted as tracks 2, 4 and 6. The top tracks have a second track width TW2 and are arranged to provide a final, second track pitch TP2, as indicated by the radial distance between centerline 172 for track 1 and centerline 182 for track 2. Nominally, TP2 is about 50% of TP1 (e.g., TP1=(2)(TP2)). The top tracks may further be written at a lower, second linear bit density as compared to the bottom tracks 170. For reference, boundary lines 184, 186 indicate where additional even tracks would overlap the respective odd tracks 1 and 7. In this way, each of the overwritten odd tracks 170 and the even tracks 180 will have substantially the same track width TW2, although such is not necessarily required.

The different track widths TW1 and TW2 can be obtained in a variety of ways, such as different transducer fly heights, different write current magnitudes, different HAMR laser diode power levels, the use of different write elements with different effective write widths, etc. When used, the different linear bit densities can be obtained using different effective write frequencies.

During operation, RRO compensation values are measured, stored and used for the even tracks 180 but not for the odd tracks 170. While this may tend to reduce the precision with which the odd (first) tracks 170 are written in FIG. 6, this technique also significantly reduces the total amount of ZAP processing required by the drive 100. It has been found that while the odd tracks 170 may tend to have more WIRRO error in the placement thereof on the medium 120 since no RRO compensation is applied during the writing of these tracks, the relatively larger widths TW1 and intertrack spacings TP1 will tend to ensure that the data can be reliably written and read. At the same time, the presence and use of RRO compensation for the subsequently interlaced even tracks 180 will tend to ensure these tracks are precisely positioned between adjacent pairs of the odd tracks 170.

In some embodiments, once the even tracks 180 have been written, updates to the user data stored on the previously written underlying odd tracks 170 can be migrated to a new location and the previously written data marked as old (stale data) to ensure that the updating of a given odd track 170 does not inadvertently affect the stored data on an even track 180. Alternatively, should a given odd track require updating, the data on the immediately adjacent even tracks can be buffered and rewritten following the writing of the updated data to the intervening odd track. For example, to update data on track 3, the contents of tracks 2-4 could be temporarily buffered in a local memory (e.g., buffer 110, FIG. 2), the new updated data for track 3 could be written without the use of RRO compensation, and then the data for tracks 2 and 4 could be rewritten with the use of RRO compensation.

Figure 8:
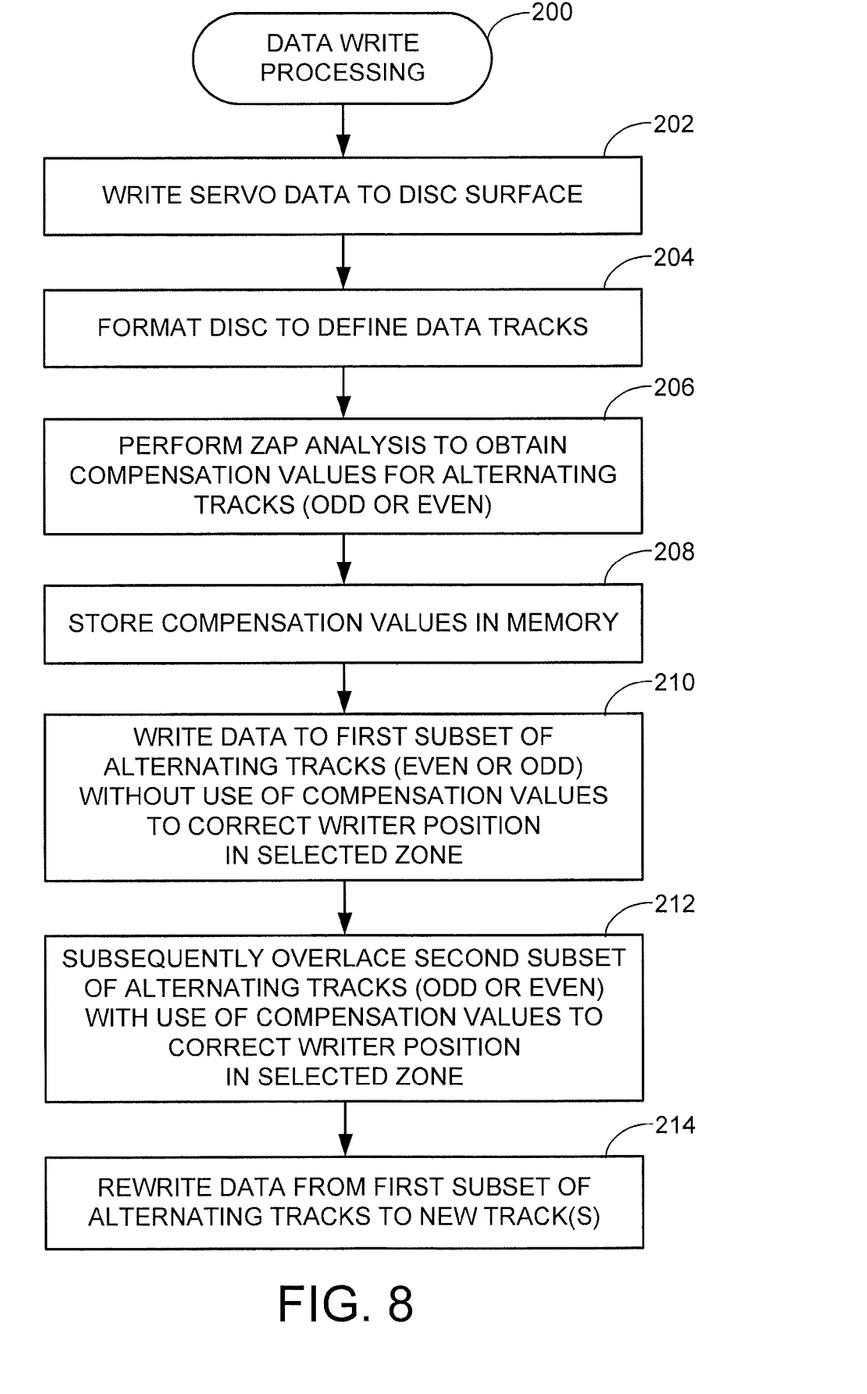
FIG. 8 is a flow chart for a data write processing routine carried out in accordance with some embodiments.

FIG. 8 provides a data write processing routine 200 illustrative of steps carried out by the storage device 100 in accordance with various embodiments. It is contemplated albeit not required that at least some of the various steps shown in FIG. 8 may be directed to programming stored in executable instructions used by the controller circuit 106 at appropriate times during operation of the storage device 100. The various steps can be appended, modified, omitted, performed in a different order, etc.

As shown by step 202, the routine commences with the writing of servo data to one or more data recording surfaces. This may be carried out during device manufacturing, and may be performed in situ (e.g., using a servo track writer after the media 120 have been installed in the device) or in a multi-disc writer (MDW) in which multiple storage media are configured with servo data prior to installation into individual storage devices. It is contemplated that the servo data will take a general form such as illustrated in FIGS. 3-4, although such is not necessarily required.

At step 204, the various disc surfaces are next subjected to a formatting operation to define data tracks on the respective disc surfaces. Further details regarding this step will be provided below, but at this point it will be appreciated that step 204 may also be carried out during initial device manufacturing to tune the device to match the particular characteristics of the device including read and write widths, etc. A zero acceleration path (ZAP) analysis is next performed at step 206.

As will be recognized, a ZAP analysis can involve placing the data transducer at a selected location, such as adjacent the centerline of a given data track or other location, and performing multiple revolutions of the disc while maintaining the transducer in a nominally fixed radial position and measuring the offsets in the servo data (e.g., servo nulls shown in FIG. 3).

Over several revolutions, the effects of non-repeatable runout (NRRO) can be filtered out, providing a fair representation of the written in repeatable run out (WIRRO) error from the servo data associated with that location. Compensation values can be derived in relation to the amount of WIRRO error, and these compensation values can be subsequently added or subtracted from actual measured position values to cancel out the RRO error.

Significantly, compensation values are not obtained during step 206 for all of the tracks on each disc surface; rather, compensation values are instead obtained for alternating tracks, such as only for odd tracks (see FIGS. 5-7). This can reduce the overall time required to complete the ZAP processing. The derived compensation values from step 206 are stored in a suitable memory at step 208.

Step 210 represents subsequent normal end user field use of the device. Data are written to a first subset of alternating tracks to record user data supplied by a host. The initial tracks are tracks for which RRO compensation values have not been obtained, such as the odd tracks 170 depicted in FIG. 6. It follows that the data are written in such a way that RRO compensation is not applied. These bottom tracks may be written at a first track width TW1 and a first track pitch TP1.

Step 212 shows a subsequent write operation during normal end user field use to write additional tracks to the disc surfaces, namely, an additional second subset of alternating tracks such as the even tracks 180 depicted in FIG. 7. These tracks are written using the RRO compensation values obtained during step 206 and are interposed between adjacent pairs of the first set of tracks written during step 210. These top tracks are written with a second track width TW2 and produce a final, second track pitch TP2. Thereafter, as required, data from the first subset of tracks are rewritten to a new location or are rewritten in place along with the adjacent second subset of tracks at step 214.

Figure 9:
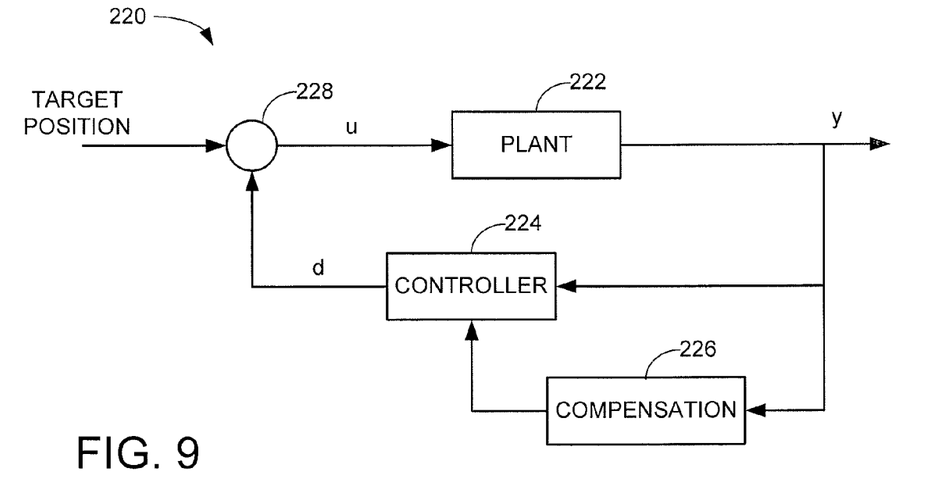
FIG. 9 is a functional block diagram for a closed loop servo circuit of the data storage device of FIG. 2 in accordance with some embodiments.

FIG. 9 provides a functional block diagram of a servo control circuit 220 of the data storage device 100 in some embodiments. The circuitry 220 in FIG. 9 generally corresponds to the operation of block 124 shown in FIG. 2. Generally, a plant block 222 represents the transducer 118, VCM 126 and disc 120 of a given head/disc interface. Input to the plant is a current command signal u. The output from the plant is a position y indicative of the resulting position of the transducer as a result of the input correction value.

The position y is fed to a feed forward servo controller 224 which is a circuit that involves plant modeling and estimating features to enable the outputting of a control signal d. The position y is further fed to a separate compensation block 226 which utilizes ZAP compensation values derived as explained above in FIG. 8 to selectively provide correction inputs to the controller 224 in generating the control signal d.

A target position indicative of the desired position of the head is summed at summing junction 228 with the control signal d to provide the input current command u to the plant. A state estimator model may be used so that a multiple of estimated positions of the head may be supplied in between the occurrence of the servo fields 130 (FIG. 4).

As noted above, the compensation values supplied by the compensation block 176 are designed to nominally remove written in repeated run out (WIRRO) errors in the placements of the various servo nulls 150, 156 in FIG. 4. WIRRO represents repeated errors that are nominally experienced during each revolution of the associated disc 106, as compared to non-repeatable run out (NRRO) which generally changes over each revolution. The WIRRO will arise from a number of factors including errors in the placement of the various PS1 and PS2 bursts (see FIG. 4).

Figure 10:
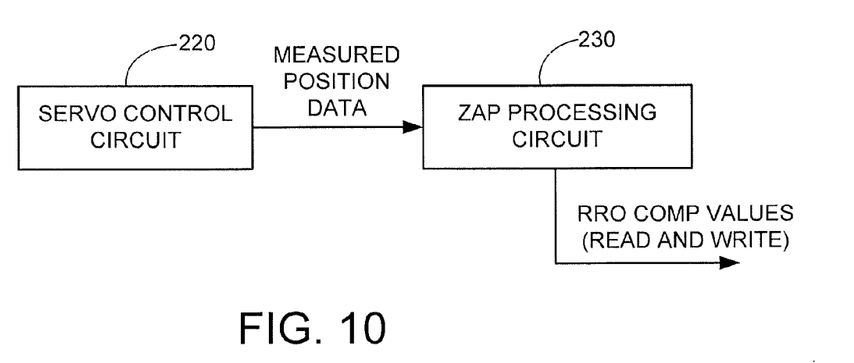
FIG. 10 is a functional block diagram for a zero acceleration path (ZAP) processing circuit that operates in conjunction with the servo control circuit of FIG. 8 to provide repeated runout (RRO) compensation values.

FIG. 10 provides a functional representation of aspects of the drive 100 in accordance with some embodiments. The servo control circuit 220 from FIG. 9, during a ZAP analysis in accordance with FIG. 8, provides measured position data to a ZAP processing circuit 230. The circuit 230 can be realized in hardware or by a programmable processor with programming in associated memory as required.

In some embodiments, the ZAP processing circuit forms a portion of the top level control circuit 106 in FIG. 2. In other embodiments, raw positional data may be supplied to an external device so that the circuit 106 is an external hardware or programmable processing circuit (such as a host computer, workstation, etc.) that is coupled to the data storage device 100. Responsive to the measured position data, the ZAP processing circuit 230 generates RRO compensation values. If externally generated, the processing circuit transfers the calculated compensation values to the device 100 for storage in a suitable location.

In further embodiments, the circuit 230 generates only a single set of compensation values that are used during both read and write operations, with adjustments made for skew angle and operation. Alternatively, the circuit 230 generates separate read and write RRO compensation values, with the read compensation values used during read operations and the write compensation values used during write operations.

Figure 11A:
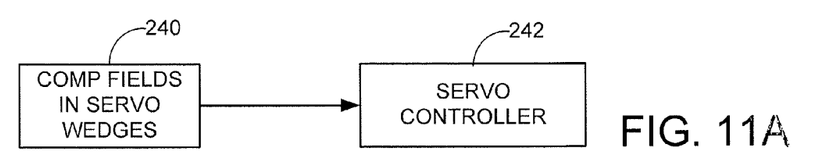
FIGS. 11A and 11B illustrate different storage methodologies that can be used to store and retrieve the compensation values from FIG. 10.
Figure 11B:
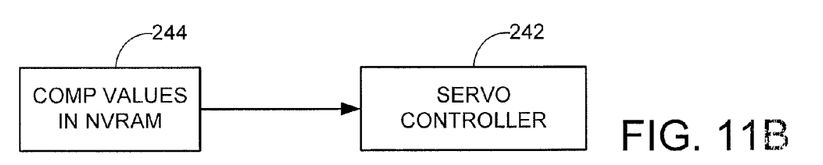

FIGS. 11A and 11B show different ways in which the RRO compensation values generated by the circuit 230 in FIG. 10 may be stored in memory for subsequent use by a servo circuit such as the circuit 220 in FIG. 9. FIG. 11A shows the storage of the RRO compensation values in the individual servo wedges formed from the servo fields 130 (see FIGS. 3 and 4). In such case, those servo fields aligned with those tracks having compensation fields may be provisioned with compensation fields 144, as depicted in FIG. 4, and will thus be longer than other servo fields that do not include such compensation fields. This is generally depicted in FIG. 11A, which shows compensation (comp) fields in various servo wedges 240 that are provided, as required, to a servo controller 242. In such case, read ZAP compensation data may be stored in a first set of compensation fields and write ZAP compensation data may be stored in a second set of compensation fields, due to the offset between the read and write elements.

Another embodiment is shown in FIG. 11B in which the compensation (comp) values for selected tracks are stored elsewhere in the device 100, such as in specially configured solid state memory or on specially configured guard (band) tracks. Each of these storage solutions are generally referred to as non-volatile random access memory (NVRAM) 244. Regardless of the storage format, as required the compensation values are supplied to the servo controller 242. In some cases, the comp values may be transferred from the NVRAM location to a local memory, such as the volatile buffer in FIG. 2, at system initialization or at other appropriate times for use as required. It will be noted that the comp values are not initially required until such time that interlaced tracks are written, which can reduce overhead processing time and resource requirements during operation.

Figure 12:
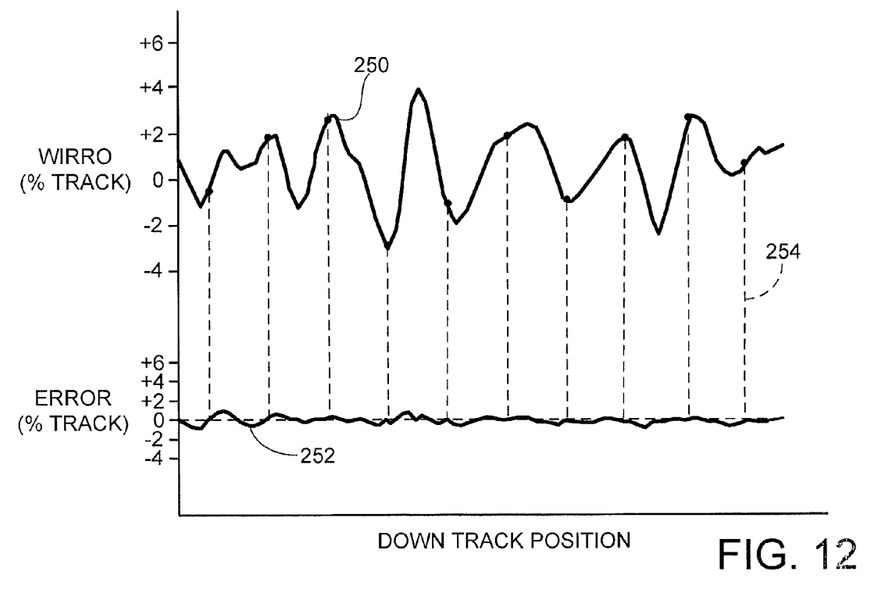
FIG. 12 is a graphical representation of exemplary written-in repeated runout (WIRRO) error that may be compensated by the circuit of FIG. 10.

FIG. 12 provides a graphical representation of exemplary WIRRO error that might typically exist along a portion of a given track. Curve 250 provides a raw WIRRO representation as a percentage of data track width across adjacent servo fields 130 in a down track direction.

Curve 252 represents the corresponding amount of error (as a percentage of track width) for the respective tracks. Each vertical dotted line 254 represents selected servo track nulls. It can be seen that, while variations in WIRRO can be provided in a relatively wide range (e.g., +/−4% of track width or more), providing RRO compensation for alternating tracks can provide an effective tradeoff between processing requirements to configure to device and the operation thereof. Different off track (e.g., read fault or write fault thresholds) can be applied to account for the larger error that will tend to exist with the non-compensated (e.g., odd) tracks.

Figure 13:
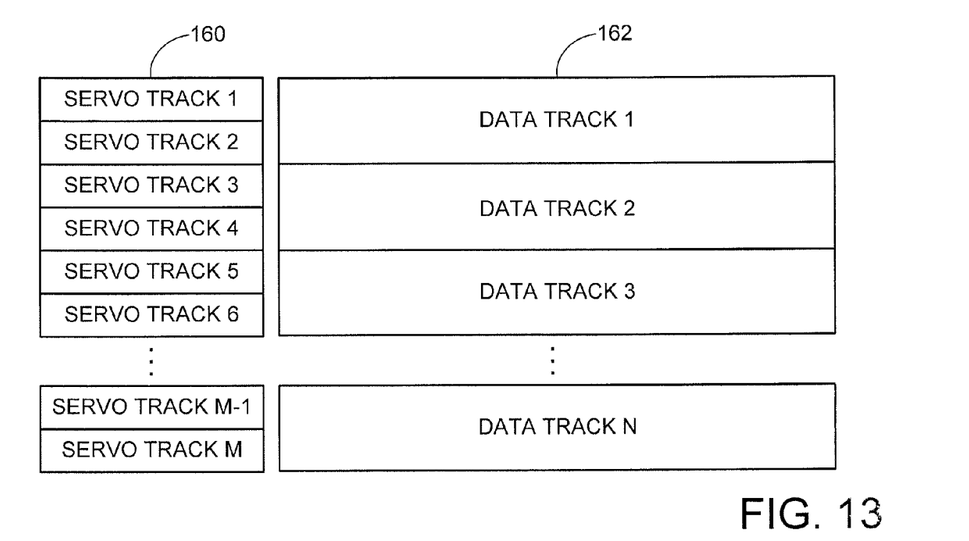
FIG. 13 shows one exemplary arrangement of servo tracks and data tracks.
Figure 14:
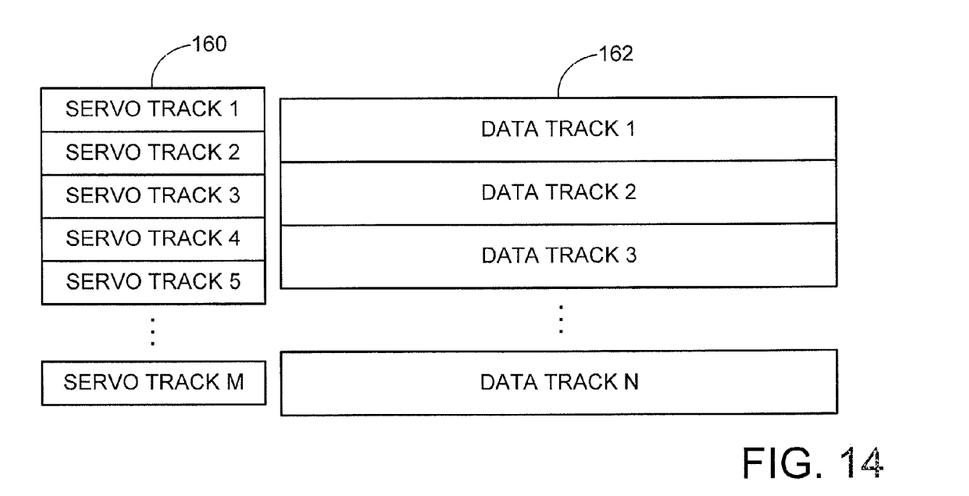
FIG. 14 shows another exemplary arrangement of servo tracks and data tracks.

FIGS. 13 and 14 show different configurations of the data tracks with respect to the servo data prearranged on the various data recording disc surfaces. FIG. 13 shows an alignment of the servo fields 130 of FIG. 4 arranged as servo tracks 260. The servo tracks are denoted as servo tracks 1 to M, with data tracks 270 aligned with the servo tracks 260 such that two servo tracks correspond to one data track. Each servo track corresponds to the arrangement in FIG. 4. Aligning the data tracks to the servo tracks as shown in FIG. 13 can be useful since the RRO compensation values can be arranged on a per servo track basis; for example, the servo null that separates servo tracks 1 and 2 can be used for data track 1, the servo null that separates servo tracks 5 and 6 can be used for data track 3, and so on.

FIG. 14 shows another arrangement in which the data tracks 270 are placed independently of the respective servo tracks 260. This can be useful in situations where the individual track widths and placement can be tailored to the characteristics of the read and write elements of the transducer. In some embodiments, ZAP compensation values are determined on a per track basis so that, for example, ZAP compensation values are obtained for odd tracks (e.g., tracks 1, 3, etc.). In other embodiments, ZAP values are determined and arranged for the servo tracks in advance of the writing of the data tracks.

The provision of RRO compensation values for alternating tracks can be applied across the entirety of the disc recording surfaces, or can be limited to certain radial zones of the disc surfaces. For example, certain high volume locations such as higher frequency outer zones can be provided with the alternating RRO compensation values to facilitate writing of interlaced tracks as depicted above in FIGS. 6-7. Other locations may utilize RRO compensation fields for every data track to facilitate higher precision writing of data, such as but not limited to a shingled magnetic recording (SMR) area where tracks are partially overlapped by subsequently written tracks and an entire set of tracks is written as a band.

It will now be appreciated that the various embodiments presented herein can provide a number of benefits. Providing RRO compensation values for alternating tracks as embodied herein allows the compensation values to be derived for points that are most calculated to provide the greatest benefit for operation of the device. Processing time and storage requirements are reduced, leading to enhancements in both processing efficiency and storage capacity for the device.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
    writing spaced apart first and second data tracks to a rotatable data recording medium using servo data written to the medium and without using repeated runout (RRO) compensation values to correct for RRO error in the servo data; and
    subsequently writing a third data track interspersed between and partially overlapping the first and second data tracks using a set of RRO compensation values to correct for the RRO error in the servo data.

2. The method of claim 1, wherein the first and second data tracks are characterized as a selected one of odd or even tracks, and the third track is characterized as a remaining one of said odd or even tracks.

3. The method of claim 1, further comprising a prior step of performing a zero acceleration path (ZAP) operation to generate respective sets of RRO compensation values for locations across the medium spaced apart by a radial distance substantially corresponding to a track pitch separation distance between the first and second data tracks, wherein the set of RRO compensation values used during the writing of the third data track is generated during the performing step.

4. The method of claim 1, further comprising dividing the medium into a plurality of concentric zones, each zone having a total data capacity made up of tracks written at a common frequency assigned to that zone, the method further comprising writing a selected zone with a selected one of odd or even data tracks to which user data are written without the use of RRO compensation values so that the selected zone is filled to nominally 50% of its total data tracks, followed by writing a remaining one of even or odd data tracks interspersed between the selected one of odd or even data tracks using sets of RRO compensation values to compensate for RRO error associated with the servo data used to control positioning during the writing of the remaining one of even or odd data tracks.

5. The method of claim 1, wherein the data recording medium is a magnetic recording medium and the RRO compensation values used to control the writing of the third track are subtracted from a detected position of a read sensor controllably positionable adjacent the third track.

6. The method of claim 1, wherein the first and second data tracks are nominally written to have a first track width TW1, and the third data track is written to have a second track width TW2 less than TW1.

7. The method of claim 1, further comprising a closed loop servo circuit to adjust a radial position of a data read/write transducer adjacent the medium during the writing of the first and second tracks and during the writing of the third track, the servo circuit obtaining estimates of the radial positions of the transducer that are not compensated by said RRO compensation values during the writing of the first and second tracks, the servo circuit compensating estimates of the radial positions of the transducer using said RRO compensation values during the writing of the third track.

8. The method of claim 1, wherein the writing of the first, second and third data tracks comprises writing user data obtained from a host device in fixed sized data sectors along the respective first, second and third data tracks in data wedges between adjacent pairs of servo fields.

9. The method of claim 8, further comprising reading the user data from the data sectors of the first and third data tracks and temporarily storing the user data in a local memory, updating at least a portion of the user data associated with the first data track, rewriting the user data to the first data track without the use of said RRO compensation values, followed by rewriting the user data to the third data track with the use of said RRO compensation values.

10. The method of claim 1, wherein the RRO compensation values are stored in servo fields embedded along the third track.

11. The method of claim 1, wherein the RRO compensation values are stored in a non-volatile random access memory (NVRAM) comprising a non-volatile solid-state memory or a selected track on the medium.

12. A data storage device comprising:
    a data storage medium having a plurality of concentric tracks configured to store user data from a host device, the tracks comprising bottom tracks interleaved with top tracks so that each top track is disposed between and partially overlaps an adjacent pair of the bottom tracks;
    a data read/write transducer adjacent the medium;
    a memory that stores repeated runout (RRO) compensation values for the top tracks; and
    a control circuit configured to write data to the medium by directing the transducer to write spaced apart first and second data tracks characterized as bottom tracks without using repeated runout (RRO) compensation values to correct for RRO error in servo data written to the medium, followed by writing a third data track characterized as a top track interspersed between the first and second data tracks to partially overlap each of the first and second data tracks using a set of the RRO compensation values from the memory to correct for the RRO error in the servo data.

13. The data storage device of claim 12, the medium comprising embedded servo fields to define the respective locations of the bottom and top tracks, wherein the data storage device stores the RRO compensation values for the top tracks and does not store RRO compensation values for the bottom tracks.

14. The data storage device of claim 12, further comprising a non-volatile random access memory (NVRAM) from which the RRO compensation values are retrieved and located to a local volatile memory for access by the control circuit during the writing of the third data track.

15. The data storage device of claim 12, wherein the first and second data tracks are odd tracks and the third data track is an intervening even track.

16. The data storage device of claim 12, wherein the medium is divided into a plurality of concentric zones, each zone having a total data capacity, the bottom tracks written at a first linear bit density, and the top tracks written at a second linear bit density less than the first linear bit density.

17. The data storage device of claim 12, wherein the data recording medium is a magnetic recording medium and the RRO compensation values used to control the writing of the third track are subtracted from a detected position of a read sensor of the data transducer.

18. The data storage device of claim 12, wherein the first and second data tracks are nominally written at a first track pitch TP1 as a radial distance between a centerline of the first data track and a centerline of the second data track, and wherein the third data track is nominally written at a second track pitch TP2 as a radial distance between the centerline of the first data track and a centerline of the third data track, the second track pitch TP2 nominally 50% of the first track pitch TP1.

19. The data storage device of claim 12, wherein the control circuit directs the writing of user data to the first, second and third data tracks from a host device in fixed sized data sectors along the respective first, second and third data tracks in data wedges between adjacent pairs of servo fields.

20. The data storage device of claim 12, wherein the control circuit is further configured to direct a reading of the user data from the data sectors of the first and third data tracks and to temporarily store the user data in a local memory, update at least a portion of the user data associated with the first data track, direct a rewriting of the user data to the first data track without the use of said RRO compensation values, followed by directing a rewriting of the user data to the third data track with the use of said RRO compensation values.

\* \* \* \* \*